(12) United States Patent
Ye

(10) Patent No.: US 7,948,759 B2
(45) Date of Patent: May 24, 2011

(54) INSTALLATION ASSEMBLY FOR HARD DISK DRIVE

(75) Inventor: Zhen-Xing Ye, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 138 days.

(21) Appl. No.: 12/494,296

(22) Filed: Jun. 30, 2009

(65) Prior Publication Data
US 2010/0271773 A1    Oct. 28, 2010

(30) Foreign Application Priority Data

Apr. 25, 2009 (CN) .......................... 2009 1 0301850

(51) Int. Cl.
| | |
|---|---|
| *H05K 7/16* | (2006.01) |
| *G06F 1/16* | (2006.01) |
| *A47F 7/00* | (2006.01) |
| *A47B 81/00* | (2006.01) |

(52) U.S. Cl. .............. 361/727; 361/679.39; 361/679.33; 211/26; 312/223.2

(58) Field of Classification Search .. 361/679.31–679.4, 361/724–727; 312/223.1, 223.2, 273, 298, 312/9.41–9.44, 334.1, 334.5; 211/26; 360/97.01–99.12
See application file for complete search history.

(56) References Cited

U.S. PATENT DOCUMENTS

| | | | |
|---|---|---|---|
| 6,611,424 B2 * | 8/2003 | Huang ..................... | 361/679.39 |
| 7,102,885 B2 * | 9/2006 | Chen et al. ............... | 361/679.31 |
| 7,104,618 B2 * | 9/2006 | Chaloner et al. ............ | 312/9.43 |
| 7,742,308 B1 * | 6/2010 | King et al. .................... | 361/727 |
| 7,864,538 B2 * | 1/2011 | Wadsworth et al. .......... | 361/727 |

* cited by examiner

*Primary Examiner* — Zachary M Pape
*Assistant Examiner* — Nidhi Desai
(74) *Attorney, Agent, or Firm* — Zhigang Ma

(57) ABSTRACT

An installation assembly for installing a number of hard disk drives includes a bracket and a number of holders. Each holder is used for holding a hard disk drive. Each holder is slidably mounted to the bracket.

8 Claims, 4 Drawing Sheets

INSTALLATION ASSEMBLY FOR HARD DISK DRIVE

BACKGROUND

1. Technical Field

The disclosure relates to an installation assembly for installing hard disk drives.

2. Description of Related Art

In a server, a high density storage having a number of hard disk drives is provided. Generally speaking, the wider the spaces between adjacent hard disk drives are, the more effective the dissipation of heat for the hard disk drives will be. However, in the common designs, a space between adjacent hard disk drives is fixed. Thus, when the thermal environment is bad for dissipating heat for the storage, the sever may not run normally.

DETAILED DESCRIPTION

Figure 1:
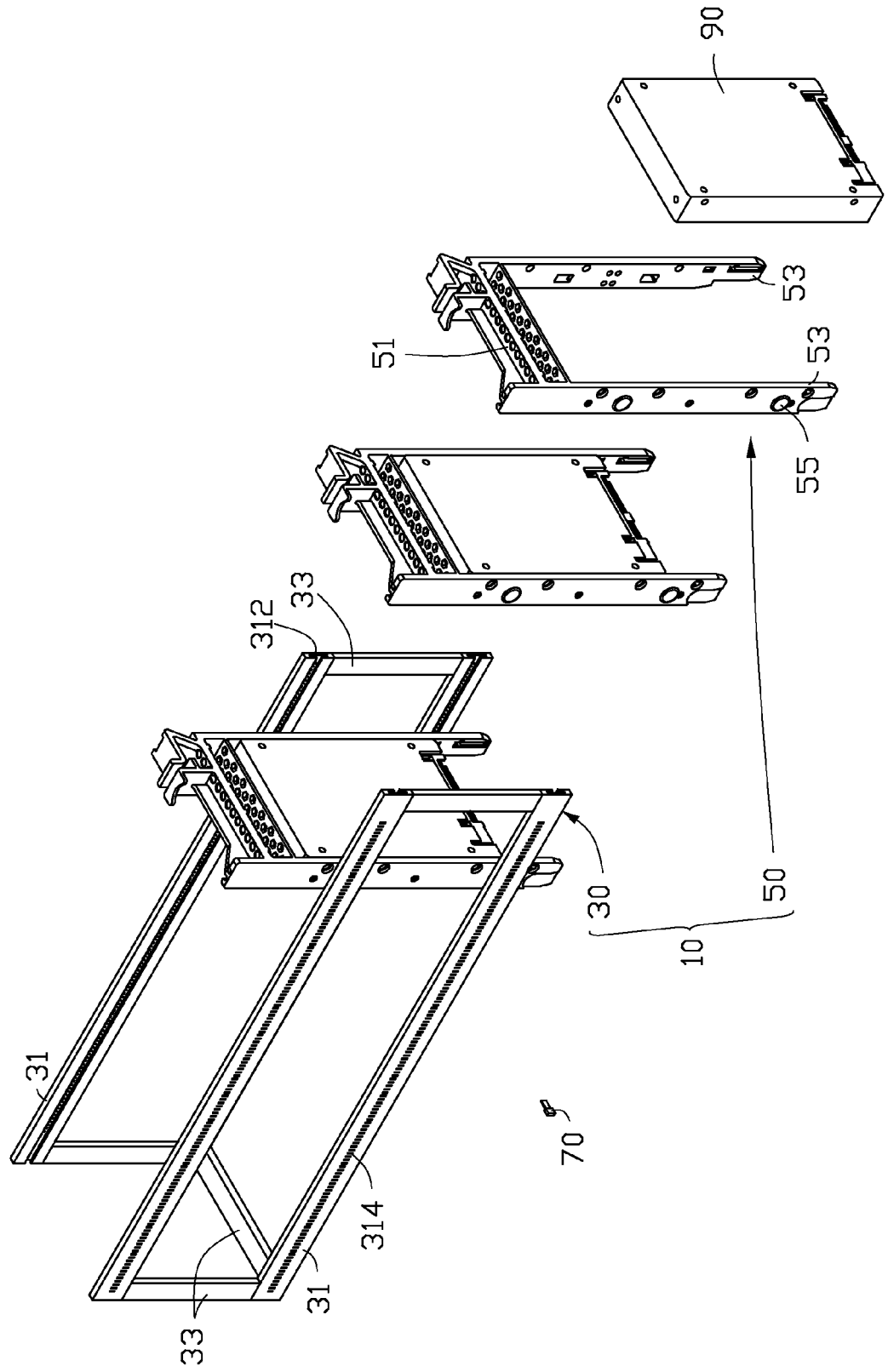
FIG. 1 is a partially assembled, isometric view of an embodiment of an installation assembly together with a plurality of hard disk drives, the installation assembly including a plurality of holders.
Figure 2:
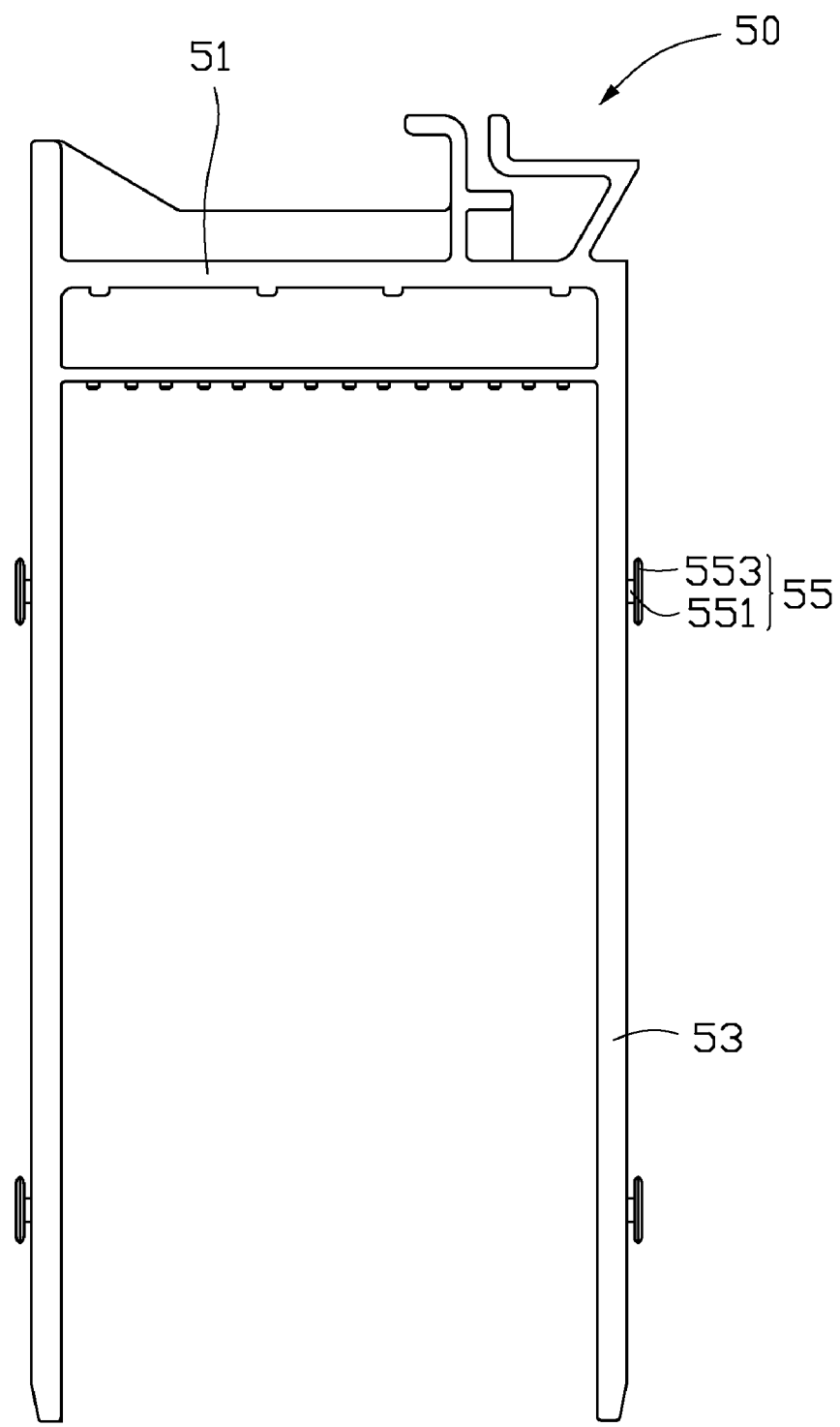
FIG. 2 is a side view of one of the holders in FIG. 1.

Referring to FIGS. 1 and 2, an embodiment of an installation assembly 10 for installing a plurality of hard disk drives 90 includes a bracket 30, and a plurality of holders 50.

The bracket 30 is used to mount the holders 50. The bracket 30 includes four slide rails 31, and a plurality of connecting pieces 33. The slide rails 31 are parallel with one another and arranged correspondingly at four edges of a cuboid structure. Each connecting piece 33 is connected between two slide rails 31 to fix the slide rails 31 together. A slide groove 312, whose cross section is T-shaped, is longitudinally defined in an inner side of each slide rail 31 along a direction of a length of the slide rail 31. A plurality of spaced inserting holes 314, communicated with the corresponding slide groove 312, is defined in an outer side of each slide rail 31, aligned along the length of the slide rail 31.

The plurality of holders 50 are used to hold the plurality of hard disk drives 90. Each holder 50 includes a panel 51, and two arms 53 perpendicularly extending from opposite ends of the panel 51. Two slide blocks 55 extend from an outer side of each arm 53, corresponding to the slide grooves 312 of two of the slide rails 31. Each slide block 55 has a T-shaped longitudinal section matching the cross section of the slide groove 312 and includes a pole 551 extending from the corresponding arm 53, and a wheel 553 rotatably mounted to a distal end of the pole 551 to be accommodated in a corresponding slide groove 312.

Figure 3:
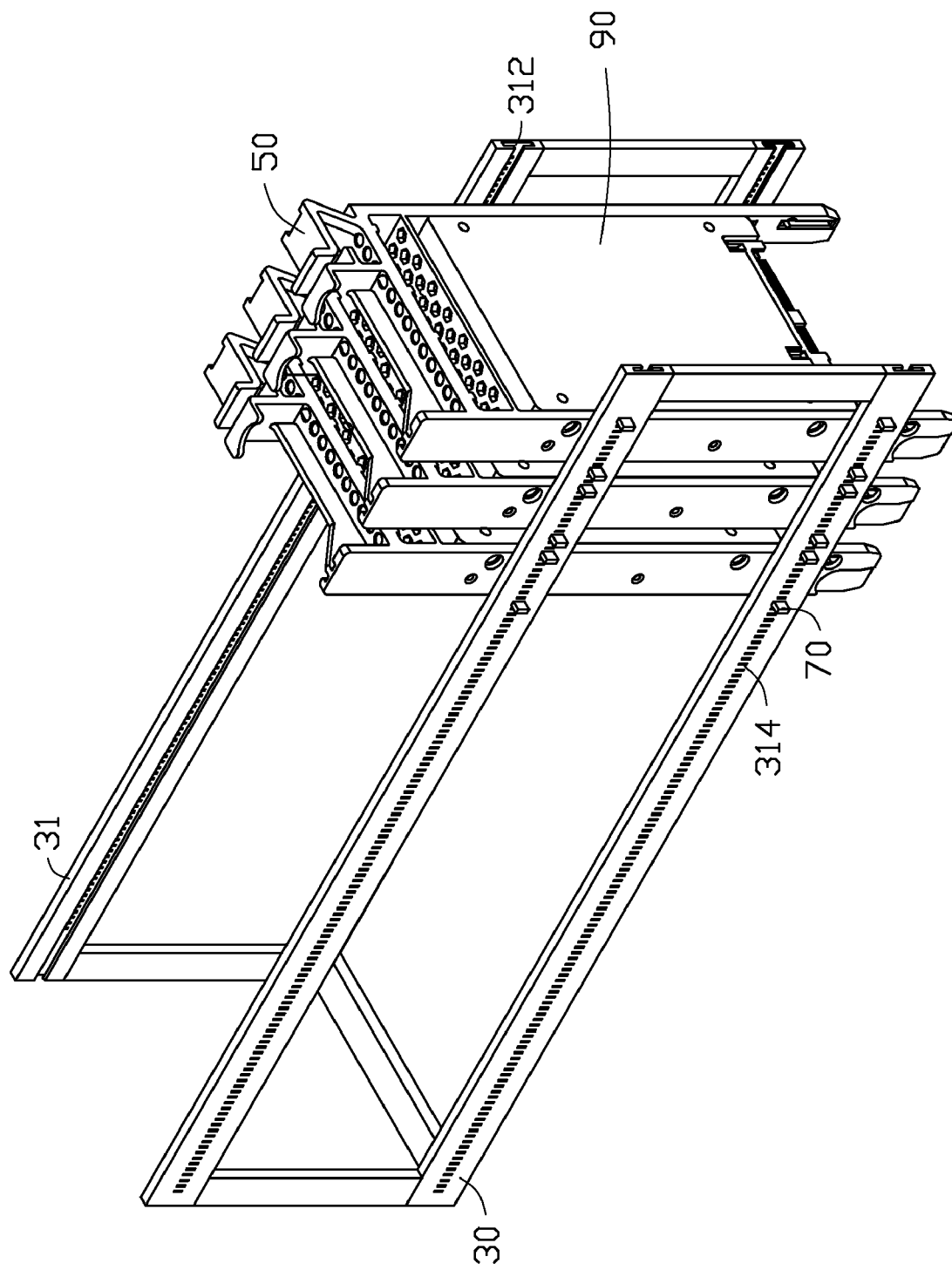
FIG. 3 is an assembled view of FIG. 1.
Figure 4:
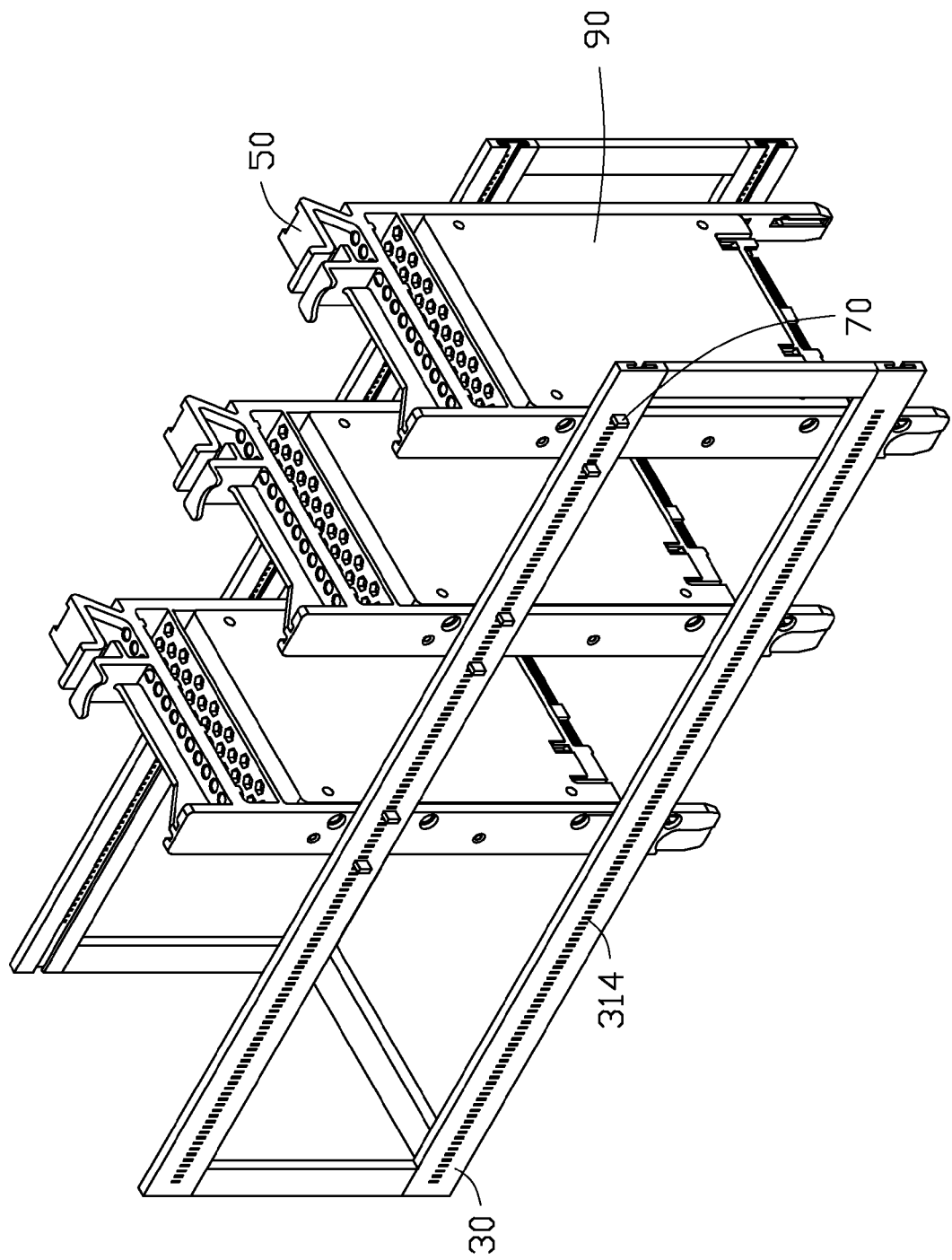
FIG. 4 is similar to FIG. 3, but showing spaces between adjacent holders being wider.

Referring to FIGS. 3 and 4, in assembly, the plurality of hard disk drives 90 are mounted to the plurality of holders 50, and each of the hard disk drives is located between the arms 53 of a corresponding holder 50. Each holder 50 is slidably mounted to the bracket 30, via the slide blocks 55 inserted into the corresponding slide grooves 312 of the bracket 30. A space between adjacent hard disk drives 90 can be adjusted via sliding the holders 50 on the bracket 30. At least two fastening pieces 70 can be inserted in two of the plurality of inserting holes 314 of the bracket 30 to engage with each holder 50 to restrict the holder 50 from opposite sides.

In use, when the thermal environment is good for dissipating heat for the plurality of hard disk drives 90, the plurality of holders 50 can be adjusted to lessen the space between adjacent hard disk drives 90, so as to increase number of the plurality of hard disk drives 90 mountable to the bracket 30 and increase storage capability. When the thermal environment is bad for dissipating heat for the plurality of hard disk drives 90, the plurality of holders 50 can be adjusted to widen the space between adjacent hard disk drives 90 to ensure the plurality of hard disk drives 90 are cooled more efficiently and effectively.

In other embodiments, two of the slide rails 31, which are located on the same level, may be omitted, and two of the slide blocks 55 of each holder 50, which are located at a lower level, may be omitted as well. The remaining slide blocks 55 of each holder 50 can engage in the slide grooves 312 of the remaining slide rails 31 to slidably mount the holders 50 to the bracket 30.

In yet another embodiment, only one of the slide rails 314 defines the plurality of inserting holes 314.

It is to be understood, however, that even though numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An installation assembly for installing a plurality of hard disk drives, comprising: a bracket; and a plurality of holders each for holding a hard disk drive, wherein each of the plurality of holders is slidably mounted to the bracket; wherein the plurality of holders are arranged in a line; wherein the bracket comprises two opposite slide rails, each of the plurality of holders comprises two opposite arms, and the arms of each of the plurality of holders are slidably mounted to the slide rails respectively; and wherein a slide groove is defined in an inner side of each of the slide rails along a direction of a length of the corresponding slide rail, a slide block extends from an outer side of each of the arms, the slide blocks are slidably engaged in the slide grooves of the corresponding slide rails; wherein the installation assembly further comprising a plurality of fastening pieces, at least one of the slide rails defining a plurality of spaced inserting holes in an outer side thereof, communicating with the corresponding slide groove and aligned along the length of the corresponding slide rail, wherein the plurality of fastening pieces are able to be inserted in the inserting holes to engage with the corresponding holders to restrict the holders from sliding.

2. The installation assembly of claim 1, wherein a cross section of each slide groove is T-shaped, a longitudinal section of each slide block is T-shaped, corresponding to the slide groove.

3. The installation assembly of claim 1, wherein each slide block comprises a pole extending from the corresponding arm, and a wheel rotatably mounted to a distal end of the pole.

4. An installation assembly for installing a plurality of hard disk drives, comprising: a bracket; and a plurality of holders each for holding a hard disk drive, wherein the holders are mounted to the bracket, a space between every two holders are adjustable; wherein the plurality of holders are slidably mounted to the bracket and arranged in a line; wherein the bracket comprises four slide rails, the slide rails are parallel with one another and arranged respectively at four edges of a cube, the holders are slidably mounted among the slide rails; and wherein a slide groove is defined in each of the slide rails along a direction of a length of the slide rail, four slide blocks extend from each of the holders corresponding to the slide grooves, the slide blocks are slidably engaged in the corresponding slide grooves.

5. The installation assembly of claim 4, wherein a cross section of each slide groove is T-shaped, a longitudinal section of each slide block is T-shaped corresponding to the slide groove.

6. The installation assembly of claim 4, wherein each slide block comprises a pole extending from the corresponding holder, and a wheel rotatably mounted to a distal end of the pole.

7. The installation assembly of claim 4, further comprising a plurality of fastening pieces, at least one of the slide rails defining a plurality of spaced inserting holes in an outer side thereof, communicating with the corresponding slide groove and aligned along the length of the corresponding slide rail, wherein the plurality of fastening pieces are able to be inserted into corresponding the inserting holes to engage with the wheel of the corresponding slide blocks to restrict the holders from sliding.

8. The installation assembly of claim 4, wherein the bracket comprises a plurality of connecting pieces each connected between two slide rails to fix the slide rails together.

\* \* \* \* \*